United States Patent
Kim et al.

(10) Patent No.: US 8,417,120 B2
(45) Date of Patent: Apr. 9, 2013

(54) TEXTILE-TYPEINTERFACE DEVICES FOR OPTICAL COMMUNICATION IN WEARABLE COMPUTING SYSTEM

(75) Inventors: Bae-Sun Kim, Daejeon (KR); Yong-Ki Son, Daejeon (KR); Dong-Woo Lee, Daejeon (KR); Jeong-Mook Lim, Daejeon (KR); Hee-Sook Shin, Daejeon (KR); Il-Yeon Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 333 days.

(21) Appl. No.: 12/814,808

(22) Filed: Jun. 14, 2010

(65) Prior Publication Data

US 2011/0069974 A1   Mar. 24, 2011

(30) Foreign Application Priority Data

Sep. 24, 2009   (KR) .................. 10-2009-0090564

(51) Int. Cl.
*H04B 10/00*   (2006.01)
*H04B 10/12*   (2006.01)
*G02B 6/00*   (2006.01)

(52) U.S. Cl.
USPC ............ 398/118; 398/142; 398/172; 362/551

(58) Field of Classification Search ................ 398/118, 398/142, 172; 362/551
See application file for complete search history.

(56) References Cited

U.S. PATENT DOCUMENTS

| 5,416,310 | A | 5/1995 | Little |
| 2002/0144442 | A1* | 10/2002 | Harasawa et al. ............... 40/586 |
| 2003/0011850 | A1* | 1/2003 | Sidorovich et al. .......... 359/172 |
| 2005/0146076 | A1* | 7/2005 | Alexander et al. ............. 264/257 |
| 2007/0037462 | A1* | 2/2007 | Allen et al. ........................ 442/5 |
| 2007/0281739 | A1 | 12/2007 | Nakagawa |
| 2008/0205035 | A1 | 8/2008 | Asvadi et al. |
| 2010/0309666 | A1* | 12/2010 | Van Herpen et al. ......... 362/253 |
| 2011/0058705 | A1* | 3/2011 | Lee et al. ....................... 381/388 |

FOREIGN PATENT DOCUMENTS

| JP | 7-98717 | 4/1995 |
| JP | 2000-148290 | 5/2000 |
| JP | 2001-230734 | 8/2001 |
| JP | 2003-259248 | 9/2003 |
| JP | 2005-524307 | 8/2005 |
| KR | 10-2004-0070115 | 8/2004 |
| KR | 10-2006-0128043 | 12/2006 |
| WO | 03/092322 A1 | 11/2003 |
| WO | WO 2004/038962 | 5/2004 |
| WO | 2005/124012 | 12/2005 |

* cited by examiner

OTHER PUBLICATIONS

Alex P.J. Hum, "Fabric Area Network—a New Wireless Communications Infrastructure to Enable Ubiquitous Networking and Sensing on Intelligent Clothing," Computer Networks, vol. 35, pp. 391-399, 2001.

*Primary Examiner* — Nathan Curs
(74) *Attorney, Agent, or Firm* — Staas & Halsey LLP

(57) ABSTRACT

Both ends of an interface may each be configured by an interface device including a light emitting unit that emits light into a textile, a light diffusion unit that widely diffuses the emitted light onto the textile and extends a light receiving range of a light receiving unit, and a light receiving unit for receiving an optical signal of the other party unlike the existing method using electromagnetic inductive coupling in the wearable computing system and a method of performing communication by using light such as infrared rays, visible light, laser, or the like as a medium is provided.

18 Claims, 5 Drawing Sheets

TEXTILE-TYPE INTERFACE DEVICES FOR OPTICAL COMMUNICATION IN WEARABLE COMPUTING SYSTEM

RELATED APPLICATIONS

The present application claims priority to Korean Patent Application Serial Number 10-2009-0090564, filed on Sep. 24, 2009, the entirety of which is hereby incorporated by reference.

BACKGROUND OF THE INVENTION

1. Field of the Invention

The present invention relates to a textile-type interface device for optical communication in a wearable computing system and, more particularly, to a textile-type interface device that performs communication by using light in a wearable computing system.

2. Description of the Related Art

With development of the computing technology, research activities for providing various types of personalized computing environments are in progress and in particular, wearable computing that researches a clothing-type wearable computer has been considered as a core field of the next-generation computing technology. As communication devices with various apparatuses that are distributed inside and outside of a system such as a clothing are required in the wearable computing field, research fields such as personal area network (PAN) and fabric area network (FAN) have been developed and various methods have been attempted.

The basic methods can be largely divided into a classic scheme in which a connection part in the clothing is configured as a removable socket type to connect external apparatuses and a wireless scheme using electromagnetic waves. In the removable socket scheme as the most commonly used scheme, a user needs to connect a socket installed in the clothing to the mobile apparatus manually, such that the user cannot easily attach and detach the mobile apparatus to and from the socket and should be watchful of waterproofing processing for a socket connector of the clothing. Since the wireless scheme using the electromagnetic waves designs a textile-type inductive antenna and implements the antenna in a clothing form uses the existing low-power near communication scheme such as radio frequency (RF), Zigbee, or Bluetooth or an electromagnetic inductive coupling scheme, the wireless scheme provides convenience in attaching and detaching the external apparatus, but it is defective in preventing the electromagnetic waves from affecting the human body and providing proper security.

SUMMARY OF THE INVENTION

The present invention is contrived to solve the above-mentioned problem and provides a new communication interfacing method using light and an apparatus thereof which can be conveniently connected with external apparatuses without being removed and can arbitrarily perform communication between an inner piece and an outer piece of a clothing.

The present invention relates to an optical communication interface device performing optical communication that includes a textile structure having a light emitting unit which can transmit optical data and a light diffusion unit which can be weaved together with a textile and connected with the light emitting unit to diffuse light at the time of transmitting the optical data by the light emitting unit.

Further, the textile structure further includes a light receiving unit that receives an external optical signal.

Further, the light diffusion unit is an optical fiber having a thin surface form.

In addition, the light diffusion unit is more widely distributed in the optical communication interface device than the light emitting unit so as to widely diffuse the optical signal.

Meanwhile, the light diffusion unit is constituted by at least one of a side emitting plastic optical fiber and an EL wire.

Further, the optical communication interface device further includes a signal generator that generates the optical signal which the light emitting unit transmits, wherein the signal generator includes an encoder that channel-encodes transmission data and a modulator that generates a modulation signal by modulating the encoded data and provides the generated signal to the light emitting unit.

Further, the optical communication interface device further includes a signal recovering unit that recovers the optical signal which the light receiving unit receives, wherein the signal recovering unit includes a demodulator that demodulates the inputted optical signal and generates the demodulated signal and a decoder that receives and channel-decodes the demodulated signal.

Meanwhile, the optical communication interface device includes two or more textile structures, and optical communication can be performed between the textile structures in the optical communication interface device.

In addition, the optical communication interface device is communicable with an electronic apparatus, the electronic apparatus includes the light emitting unit that transmits the optical data, a light diffusion unit that diffuses light at the time of transmitting the optical data by the light emitting unit, and the light receiving unit that receives the external optical signal.

Meanwhile, the optical communication interface device performs optical communication with articles including the textile structure.

Further, a textile-type button generating a control signal for controlling an optical communication target is attached to the optical communication interface device.

In addition, the signal of the light emitting unit is any one of infrared rays, visible light, and laser.

Meanwhile, the present invention relates to an electronic apparatus performing optical communication with an optical communication interface device that includes a light emitting unit that transmits optical data; and a light diffusion unit that is connected to the light emitting unit to diffuse light at the time of transmitting the optical data using the light emitting unit.

Further, the electronic apparatus further includes a light receiving unit that receives an external optical signal.

Meanwhile, the light diffusion unit is more widely distributed than the light emitting unit so as to widely diffuse the optical signal.

In addition, the light diffusion unit is constituted by at least one of a side emitting plastic optical fiber and an EL wire.

Meanwhile, the electronic apparatus further includes a signal generator that generates the optical signal which the light emitting unit transmits, wherein the signal generator includes an encoder that channel-encodes transmission data and a modulator that generates a modulation signal by modulating the encoded data and provides the generated signal to the light emitting unit.

Further, the electronic apparatus further includes a signal recovering unit that recovers the optical signal which the light receiving unit receives, wherein the signal recovering unit includes a demodulator that demodulates the inputted optical signal and generates the demodulated signal and a decoder that receives and channel-decodes the demodulated signal.

Further, wherein two or more light receiving units, light emitting units, and light diffusion units are included.

In addition, the signal of the light emitting unit is any one of infrared rays, visible light, and laser.

A method and an apparatus according to the present invention can provide a conveniently removable user friendly interfacing method in which communication can be made between clothes such as an inner piece and an outer piece or an upper garment and a lower garment as well as internal and external apparatuses of the clothing by providing an interface that does not affect a human body of a user who uses the wearable computing system, and can be weaved in the textile type to implement the wearable system.

Further, the present invention can be applied to a bag, a cap, etc. which can be weaved in a textile form and can be applied to all textile merchandises.

Furthermore, even in spaces such as hospitals and airplanes where use of an RF is limited, it is possible to use the present invention and since the present invention is configured based on the textile, the present invention is easy to wash.

DETAILED DESCRIPTION OF THE PREFERRED EMBODIMENTS

Hereinafter, the present invention will be described in detail with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of elements in the figures may be exaggerated for explicit comprehension.

Further, a textile described in the specification includes a bag, a cap, a curtain, a table cover, etc. as well as a clothing.

Hereinafter, preferred embodiments of the present invention will be described in detail with reference to the accompanying drawings.

First Embodiment

Figure 1:
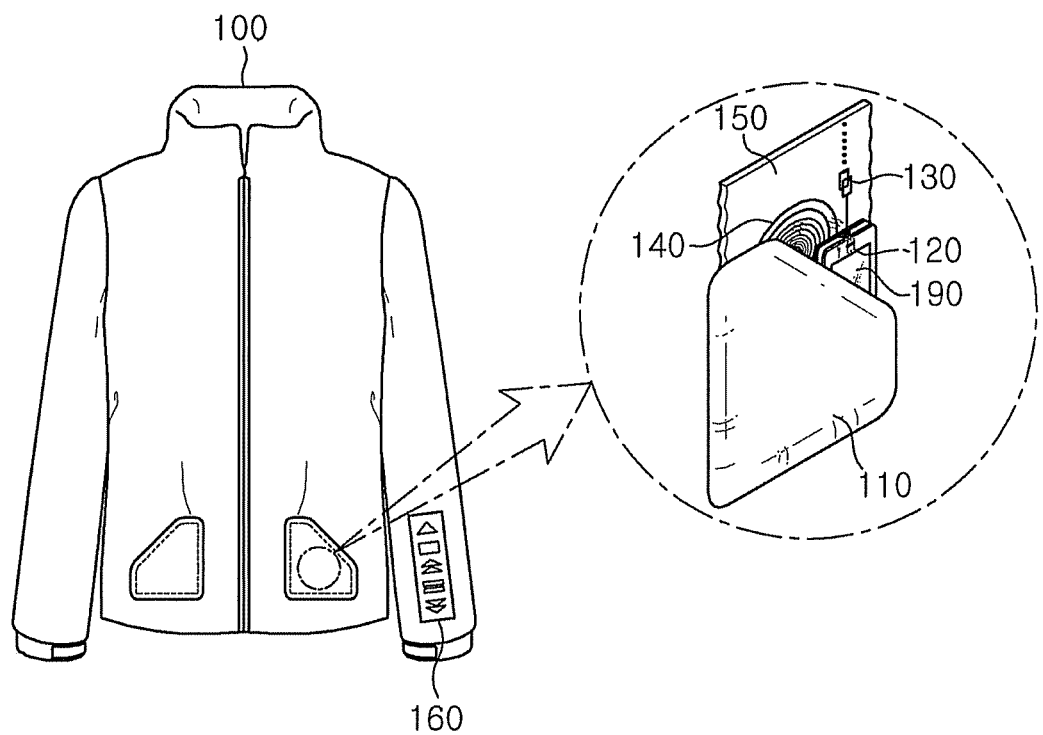
FIG. 1 is an exemplary diagram for describing a wearable computing system according to a first embodiment of the present invention.
Figure 4:
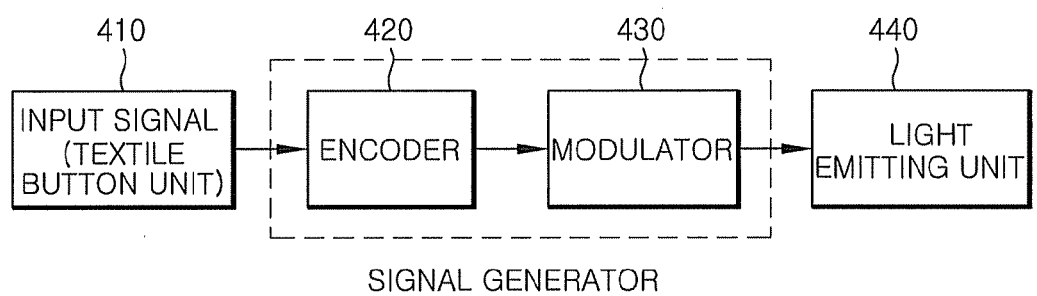
FIG. 4 is a block diagram for describing an operation of a light emitting unit in a wearable computing system shown in FIG. 1 according to a first embodiment.

FIG. 1 is a diagram for describing explaining a wearable computing system according to a first embodiment of the present invention. FIG. 4 is a block diagram for specifically describing a configuration of optical communication interface clothing in a wearable computing system.

The wearable computing system according to the first embodiment of the present invention includes textile-based optical interface clothing 100 (hereinafter, referred to as 'clothing') and a mobile apparatus (for optical communication) 190.

Referring to FIG. 1, a receiving unit (i.e., pocket) is formed in the clothing 100 and a user's portable terminal 190 is received in the pocket 110. A textile-type button 160 for controlling the mobile apparatus 190 is provided in an arm part of the clothing. Since the button 160 is weaved in the clothing 100 in a textile type, the button 160 can be easily washed. A textile structure for optical communication is formed in the pocket 110 of the clothing 100. The textile structure serves to transfer a control signal generated in the textile-type button 160 to the mobile apparatus 190 by using the optical communication. The textile structure includes a light emitting unit 130 and a light diffusion unit 140. The light emitting unit 130 as a part generating an optical signal may be provided as a means emitting light having a predetermined wavelength such as infrared rays, LED light, laser, etc. The light diffusion unit 140 may be provided as a means which can be weaved in the textile type by using a means widely transferring light emitted from a small light source such as an optical fiber such as a side emitting plastic optical fiber or a light diffuse plate or may be provided in a plane type such as thin paper. The light diffusion unit 140 can be distributed widely on the clothing 100 in a circular shape or a coiled shape or a zigzag bent shape in order to widely diffuse light with efficiency. By this method, it is possible to more effectively and efficiently transfer the optical signal. The textile 150 configuring the clothing 100 may be provided as a textile having low light transmittance to shield external natural light or artificial light for the optical communication and as a result, optical communication of lower power consumption is performed while external light interference is interrupted. The textile 150 may be weaved together with the light diffusion unit 140. The pocket 110 of the clothing 100 may also be provided as a textile having low light transmittance in order to block an external light source. The mobile apparatus 190 can include the light emitting unit and the light diffusion unit and the electronic apparatus that may further include a light receiving unit 120 that receives an external optical signal and can be provided as various entertainment mobile apparatuses such as a cellular phone, an MP3, a PMP, etc.

Hereinafter, referring to FIG. 4, an operation of the textile structure will be described. First, when a user presses the textile-type button 160 of the clothing 100 in order to control the mobile apparatus 190, an input signal 410 is generated. An encoder 420 receives the signal 410 generated by pressing the button to channel-encode the signal data 410. Thereafter, a modulator 430 modulates the channel-encoded data into the optical signal. The modulated optical signal is transferred to the textile structure and emitted by the light emitting unit 130 of the textile structure. When the optical signal is emitted by the light emitting unit 130, the optical signal is widely diffused by the light diffusion unit 140. The reason for this is that the light diffusion unit 140 is widely distributed on the clothing in a thin surface form. As a result, the mobile apparatus 190 can more effectively receive the optical signal. The light emitting unit 130, the light diffusion unit 140, and the light receiving unit 120 may further include an amplification means for amplifying a signal. Although the clothing is described in the embodiment, the present invention is not limited to only the clothing and can be applied to all articles to which the textile structure can be attached, such as a bag, a cap, a table cover, a curtain, etc.

Since the wearable computing system performs communication by using the optical signal, the method and the apparatus according to the present invention can provide a conveniently removable user friendly interfacing method in which communication can be made between clothes such as an inner piece and an outer piece or an upper garment and a lower garment as well as internal and external apparatuses of the clothing by providing an interface that does not affect a human body of a user who uses the wearable computing system, and can be weaved in the textile type to implement the wearable system.

Further, even in spaces such as hospitals and airplanes where use of an RF is limited, it is possible to use the present invention and since the present invention is configured based on the textile, the present invention is easy to wash.

Second Embodiment

Figure 2:
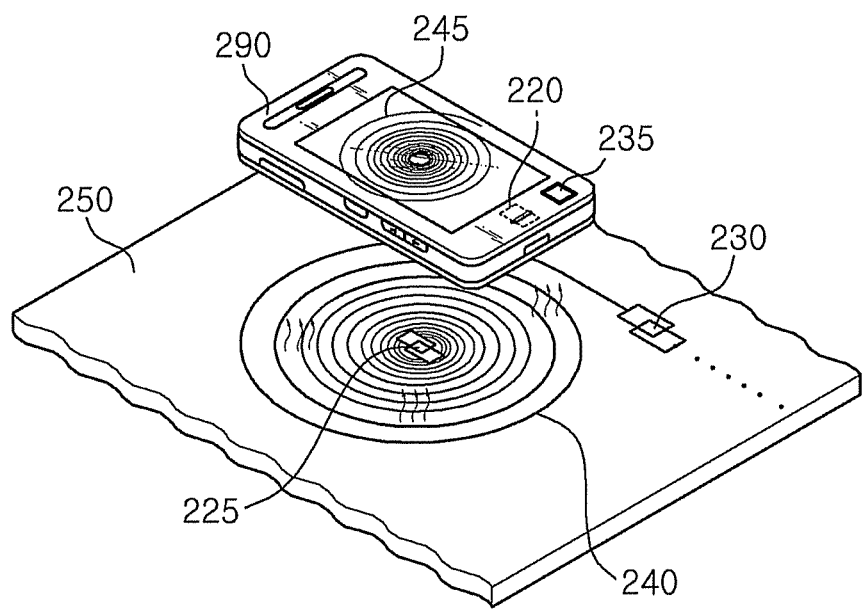
FIG. 2 is an exemplary diagram for describing a wearable computing system according to a second embodiment of the present invention.
Figure 5:
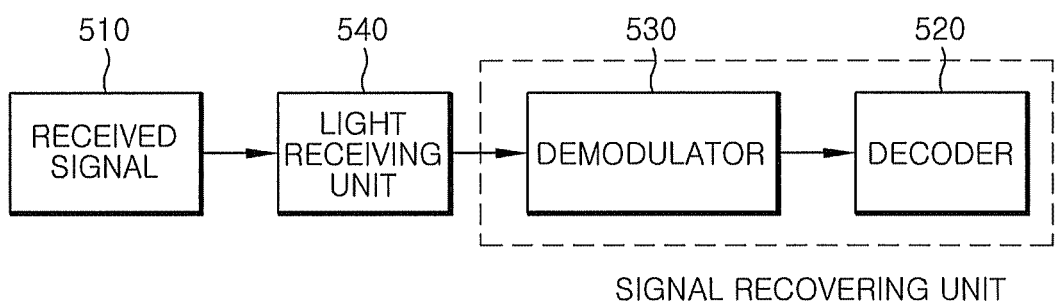
FIG. 5 is a block diagram for describing an operation of a light receiving unit shown in FIG. 2 according to a second embodiment.

FIG. 2 is an exemplary diagram for describing a wearable computing system according to a second embodiment of the present invention. FIG. 5 is a block diagram for describing operations in light receiving units 220 and 225 of FIG. 2.

The wearable computing system according to the second embodiment of the present invention includes a textile structure (including 225, 230, and 240) attached to a textile-based optical communication interface clothing and a mobile apparatus 290.

Referring to FIG. 2, the light receiving unit 225, a light emitting unit 230, and a light diffusion unit 240 are weaved together with a textile 250 and provided in a clothing. Unlike the first embodiment, the textile structure further includes the light receiving unit 225. The textile structure serves to transfer a control signal generated in a textile-type button to the mobile apparatus 290 by using optical communication and receive a signal generated by the mobile apparatus 290 through the light receiving unit 225. The light receiving unit 225 is configured by a kind of sensor. As a signal which the light receiving unit 225 can sense, all light beams having a predetermined wavelength such as infrared rays, LED light, laser, etc. can be used. The light emitting unit 230 serves to transfer signal generated in the clothing to the mobile apparatus 290. In emitting light, light is more efficiently transferred to the mobile apparatus 290 through the light diffusion unit 240. The light diffusion unit 240 may be provided as a means which can be weaved in the textile type by using a means widely transferring light emitted from a small light source such as an optical fiber such as a side emitting plastic optical fiber or a light diffuse plate or may be provided in a plane type such as thin paper. The light diffusion unit 240 can be widely distributed on the clothing 100 in a circular shape or a coiled shape in order to widely diffuse light with efficiency. By this method, it is possible to more effectively and efficiently transfer the optical signal. Meanwhile, the light receiving unit 225 is also widely distributed like the light diffusion unit 240 to be provided in order to more effectively and efficiently perform a sensing ability.

The mobile apparatus includes the light receiving unit 220, the light emitting unit 235, and the light diffusion unit 245 in order to perform optical communication with the textile structure. The light receiving unit 225, the light emitting unit 230, and the light diffusion unit 240 of the mobile apparatus can be provided to have the same function as the light receiving unit 225, the light emitting unit 230, and the light diffusion unit 240 installed in the textile structure.

Therefore, the mobile apparatus and the clothing can bi-directionally send and receive data signal to and from each other unlike the first embodiment.

Hereinafter, referring to FIGS. 4 and 5, operations of the textile structure and the mobile apparatus will be described. First, when a user presses a textile-type button of the clothing in order to control the mobile apparatus 290, an input signal 410 is generated. An encoder 420 receives the signal 410 generated by pressing the button to channel-encode the signal data 410. Thereafter, a modulator 430 modulates the channel-encoded data into the optical signal. The modulated optical signal is transferred to the textile structure and emitted by the light emitting unit 230 of the textile structure. When the optical signal is emitted by the light emitting unit 230, the optical signal is widely diffused by the light diffusion unit 240. The reason for this is that the light diffusion unit 240 is widely distributed on the clothing in a thin surface form. As a result, the mobile apparatus 290 can more effectively receive the optical signal. The light emitting unit 230 and the light diffusion unit 240 may further include an amplification means for amplifying a signal. An optical signal 510 transmitted as above is received by the light receiving unit 220 and 540 of the mobile apparatus 290. The optical signal 510 received as above is demodulated by a demodulator 530. A decoder 520 receives the signal demodulated by the demodulator 530 and channel-decodes the signal to recover data. Through the recovered data, the mobile apparatus 290 is controlled. Thereafter, data may be sent from the mobile apparatus to the clothing. For example, the condition of the mobile apparatus, etc. can be displayed on an LCD window of the clothing or an operation of the button can be controlled. For this, the mobile apparatus 290 includes the light emitting unit 235 and as shown in FIG. 4, the mobile apparatus 290 transmits the optical signal at the light emitting unit 235 through the encoder and the modulator. The transmitted optical signal is received by the light receiving unit 225 of the textile structure of the clothing and data can thus be transferred through the demodulator and the decoder of FIG. 5. The transferred data can be used to perform necessary jobs in the clothing. Further, another electronic apparatus is provided in the clothing, such that the electronic apparatus and the mobile apparatus 290 may communicate with each other. Although the clothing is described in the embodiment, the present invention is not limited to only the clothing and can be applied to all articles to which the textile structure can be attached, such as a bag, a cap, a table cloth, a curtain, etc.

Third Embodiment

Figure 3:
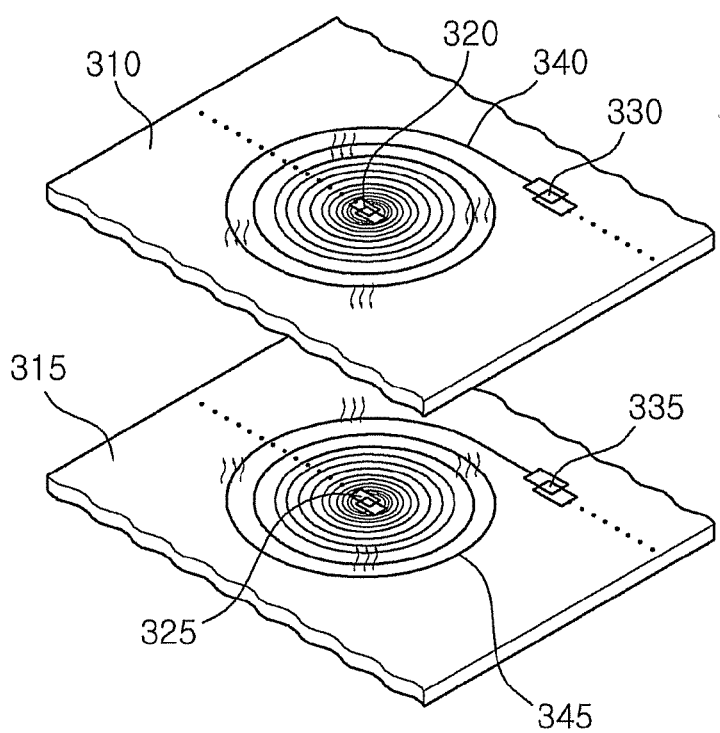
FIG. 3 is an exemplary diagram for describing a wearable computing system according to a third embodiment of the present invention.
Figure 6:
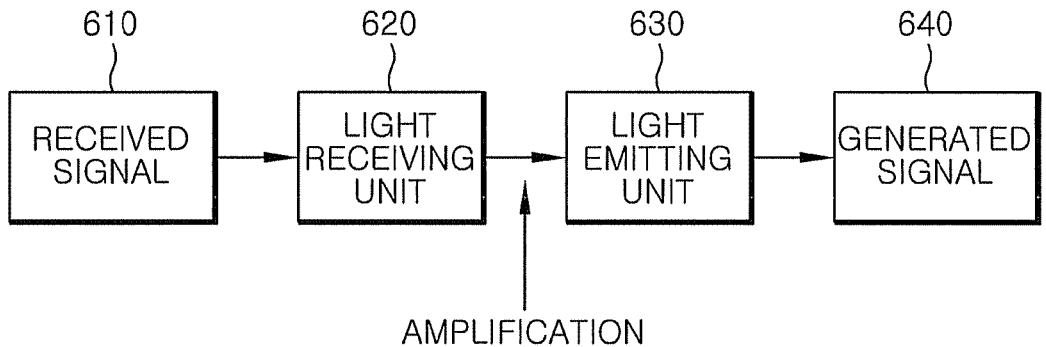
FIG. 6 is a block diagram for describing an operation of a third embodiment shown in FIG. 3.

FIG. 3 is an exemplary diagram for describing a wearable computing system according to a third embodiment of the present invention. FIG. 6 is a block diagram for describing an operation of FIG. 3 according to the present invention.

The wearable computing system according to the third embodiment of the present invention includes two or more textile structure attached to a textile-based optical communication interface clothing. The first and second embodiments illustrate communication between one textile structure and one electronic apparatus, while the third embodiment illustrates communication between the textile structures.

First, referring to FIG. 3, the textile structures are provided in an inner clothing 310 and an outer clothing 315. Therefore, a general user wears a plurality of clothings with a device disclosed in the present invention and a signal to be transferred is transferred from the inner clothing to the outer clothing. The inner clothing may be generally constituted by sensors measuring bio-signals of a user. Further, an external signal may be transferred to the inner clothing. In this case, center frequencies of an optical communication method used at both ends are set differently from each other and an optical filter is used to thereby prevent disturbance caused due to mutual interference. Although the inner clothing 310 and the outer clothing 315 are described in the present embodiment, they also include an upper garment and a lower garment, a clothing and a cap, and articles of different structures. First, the inner clothing 310 includes a light receiving unit 320, a light emitting unit 330, and a light diffusion medium 340 and the outer clothing 315 includes a light receiving unit 325, a light emitting unit 335, and a light diffusion medium 345. In the inner clothing 310 and the outer clothing 315, functions of the light receiving units 320 and 325, the light emitting units 330 and 335, and the light diffusion media 340 and 345 can be configured as described in the first and second embodiments. Further, the light receiving unit, the light emitting unit, and the light diffusion medium may further include a control unit for controlling the functions.

Through FIG. 6, the operation of the third embodiment by FIG. 3 will be described. The operation of transferring the data from the inner clothing 310 to the outer clothing 315 will be first described. First, data (an input signal generated in the textile button unit, etc.) to be transmitted is converted into the optical signal through the encoder and the modulator. The converted optical signal emits light through the light emitting unit 330 of the inner clothing 310 and the emitted light is diffused through the light diffusion medium 340. The emitted optical signal 610 is received in the light receiving unit 325 and 620 of the outer clothing 315. The light receiving unit 325 is generally constituted by the optical sensor and since the received optical signal becomes weak while passing through the clothing, the light receiving unit 325 may further include an optical signal amplifier. The optical signal received through the light receiving unit 325 again emits light through the light emitting unit 335 and 630 and the light diffusion medium 345 and may be transmitted to another textile structure or transmitted to the electronic apparatus. At this time, in the textile structure of the outer clothing, a step of modulating or demodulating the signal may be further included or a data processing step such as error correction, etc. may be further included in order to reduce a signal error.

The above-mentioned step can be similarly applied even in case of transmitting the data to the inner clothing 310 from the outer clothing 315. That is, the signal emitted from the light emitting unit 335 and the light diffusion medium 345 of the outer clothing is received in the light receiving unit 320 of the inner clothing 310 so as to transmit the data.

As such, a cloth thick clothing including several textile structures in one clothing or a cloth divided into the upper garment and the lower garment can communicate with each other. Further, all textile-type articles can communicate by using the textile structure.

Figure 7:
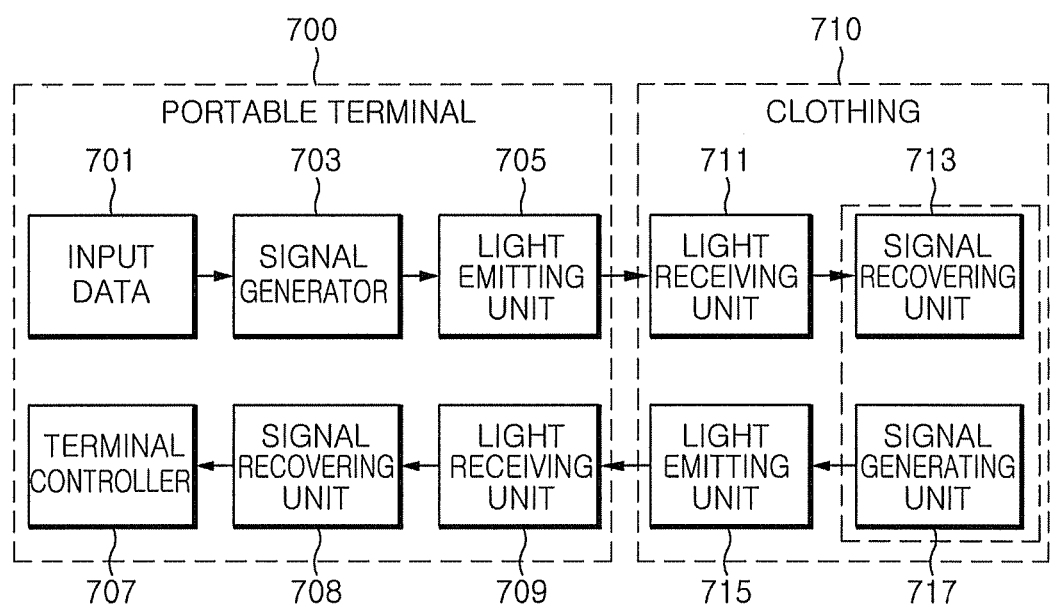
FIG. 7 is a block diagram for describing an operation between a portable terminal and a clothing.

FIG. 7 is a block diagram simply configuring data communication between a portable terminal (or electronic apparatus) and a clothing. In case when data is transferred from the portable terminal 700 to the clothing 710, input data 701 is transferred through a signal generator 703 including the encoder and the modulator to generate the optical signal and emit light through a light emitting unit 705. The emitted signal is received in a light receiving unit 711 of the clothing 710 and recovered to the data through a signal recovering unit 713.

Meanwhile, in case when the data is transferred from the clothing 710 to the portable terminal 700, a signal generating unit 717 of the clothing 710 is generated to emit light in the light emitting unit 715 of the clothing 710 and the emitted light is received in the light receiving unit 709 of the portable terminal 700 to recover the data through the signal recovering unit 708, such that a terminal controller 707 controls the portable terminal 700.

The portable terminal 700 includes the light receiving unit, the light emitting unit, and the light diffusion unit and two or more components can be installed on both surfaces of the portable terminal. By this configuration, even in case when the portable terminal is turned over in the pocket of the clothing, the portable terminal can easily perform optical communication with the clothing.

Further, the light diffusion unit installed in the electronic apparatus may be installed in the electronic apparatus or outside of the electronic apparatus. In case when the light diffusion unit is installed in the electronic apparatus, the surface of the electronic apparatus may be made of a transparent material so as to perform the optical communication. Further, the light diffusion unit may be constituted by a side emitting plastic optical fiber or an EL wire in a thin surface similarly as above and may be widely distributed in a spiral form or a zigzag form in order to widely diffuse the light. Further, as another form of the light diffusion unit, the light diffusion unit may be configured by disposing LED or IR emitter devices on a fabric in a matrix form.

Although the clothing is described in the embodiment, the present invention is not limited to only the clothing and can be applied to all articles to which the textile structure can be attached, such as a bag, a cap, a table cover, a curtain, etc.

Since the optical communication interface clothing in the wearable computing system according to the present invention performs communication with the portable terminal or the inner piece and the outer piece of the clothing by using the optical signal, the optical communication interface clothing can be implemented without using a wireless communication module using an RF so as to prevent electromagnetic waves from affecting a human body. Further, since the wearable computing system of the present invention can be applied even to any part in the clothing and the clothing and the portable terminal perform near optical communication, the communication security is excellent.

Some steps of the present invention can be implemented as a computer-readable code in a computer-readable recording medium. The computer-readable recording media includes all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc. and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the preferred embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An optical communication interface device performing optical communication, comprising:
   a textile structure including a light emitting unit which can receive data and emit optical data and a light diffusion unit weaved together with a textile and connected with the light emitting unit to diffuse light at the time of transmitting the optical data by the light emitting unit,
   wherein the textile structure further includes a light receiving unit that receives an external optical signal.

2. The optical communication interface device according to claim 1, wherein the light diffusion unit is an optical fiber having a thin surface form.

3. The optical communication interface device according to claim 1, wherein the light diffusion unit is more widely distributed in the optical communication interface device than the light emitting unit so as to widely diffuse the optical signal.

4. The optical communication interface device according to claim 1, wherein the light diffusion unit is constituted by a side emitting plastic optical fiber.

5. The optical communication interface device according to claim 1, further comprising;
   a signal generator that generates the optical signal which the light emitting unit transmits,
   wherein the signal generator includes an encoder that channel-encodes transmission data and a modulator that generates a modulation signal by modulating the encoded data and provides the generated signal to the light emitting unit.

6. The optical communication interface device according to claim 1, further comprising:
   a signal recovering unit that recovers the optical signal which the light receiving unit receives,
   wherein the signal recovering unit includes a demodulator that demodulates the inputted optical signal and generates the demodulated signal and a decoder that receives and channel-decodes the demodulated signal.

7. The optical communication interface device according to claim 1, wherein the optical communication interface device includes two or more textile structures, and optical communication is performed between the textile structures in the optical communication interface device.

8. The optical communication interface device according to claim 1, wherein the optical communication interface device is communicable with an electronic apparatus, the electronic apparatus includes a light emitting unit that transmits the optical data, a light diffusion unit that diffuses light at the time of transmitting the optical data by the light emitting unit, and a light receiving unit that receives the external optical signal.

9. The optical communication interface device according to claim 1, wherein the optical communication interface device performs optical communication with articles including the textile structure.

10. The optical communication interface device according to claim 1, wherein a textile-type button generating a control signal for controlling an optical communication target is attached to the optical communication interface device.

11. The optical communication interface device according to claim 1, wherein the signal of the light emitting unit is any one of infrared rays, visible light, and laser.

12. An electronic apparatus performing optical communication with an optical communication interface device, comprising:
   a light emitting unit that receives data and emits optical data; and
   a light diffusion unit that is connected to the light emitting unit to diffuse light at the time of transmitting the optical data using the light emitting unit, and
   a light receiving unit that receives an external optical signal.

13. The electronic apparatus according to claim 12, wherein the light diffusion unit is more widely distributed than the light emitting unit so as to widely diffuse the optical signal.

14. The electronic apparatus according to claim 12, wherein the light diffusion unit is constituted by a side emitting plastic optical fiber.

15. The electronic apparatus according to claim 12, further comprising:
   a signal generator that generates the optical signal which the light emitting unit transmits,
   wherein the signal generator includes an encoder that channel-encodes transmission data and a modulator that generates a modulation signal by modulating the encoded data and provides the generated signal to the light emitting unit.

16. The electronic apparatus according to claim 12, further comprising:
   a signal recovering unit that recovers the optical signal which the light receiving unit receives,
   wherein the signal recovering unit includes a demodulator that demodulates the inputted optical signal and generates the demodulated signal and a decoder that receives and channel-decodes the demodulated signal.

17. The electronic apparatus according to claim 12, wherein two or more light receiving units, light emitting units, and light diffusion units are included.

18. The electronic apparatus according to claim 12, wherein the signal of the light emitting unit is any one of infrared rays, visible light, and laser.

* * * * *